Feb. 6, 1962  E. O. SODERBERG  3,019,852
CLIMBER
Filed Jan. 2, 1958  3 Sheets-Sheet 1
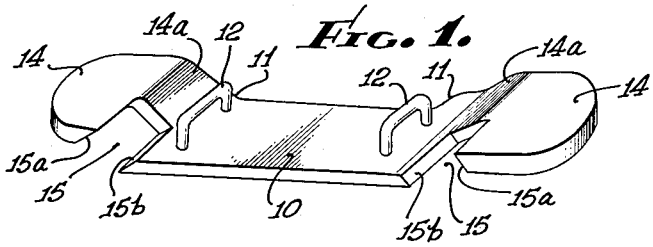
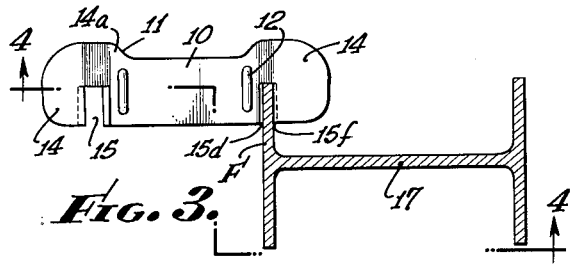
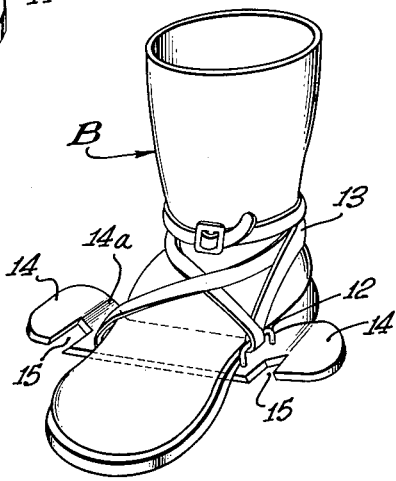
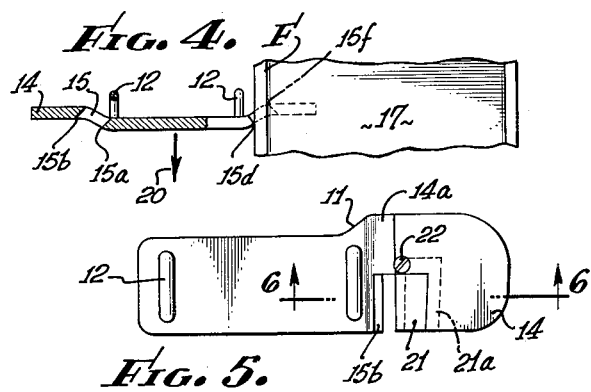
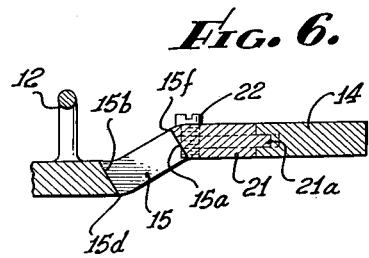
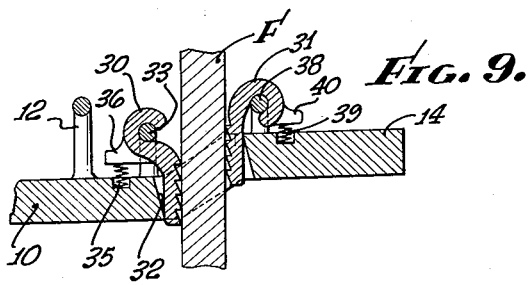
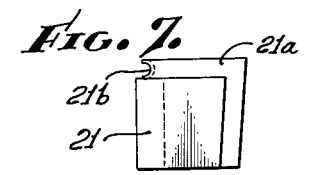
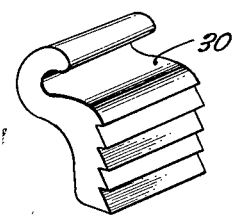
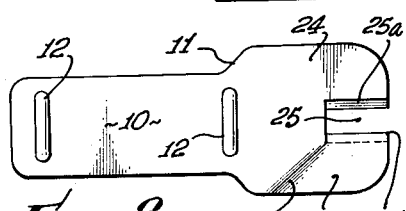
INVENTOR.
EMIL O. SODERBERG
BY
Huebner and Worrel
ATTORNEYS.

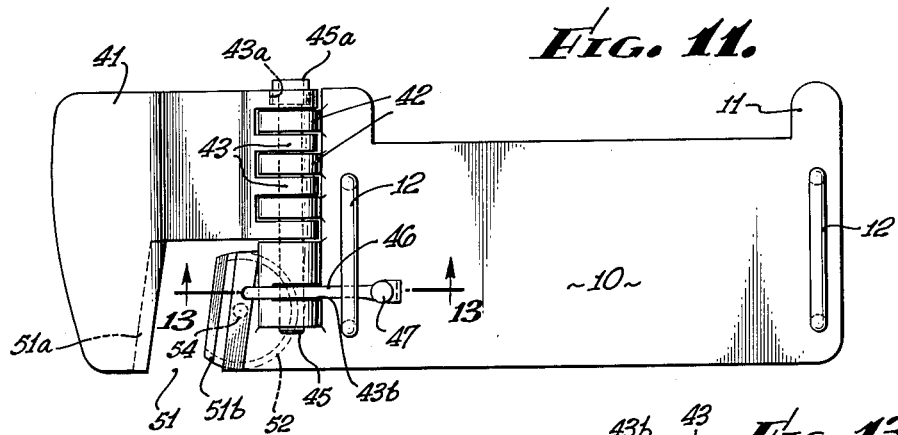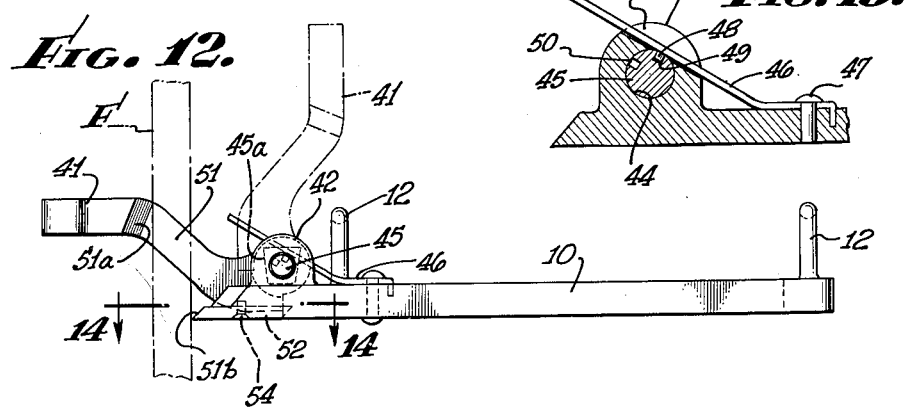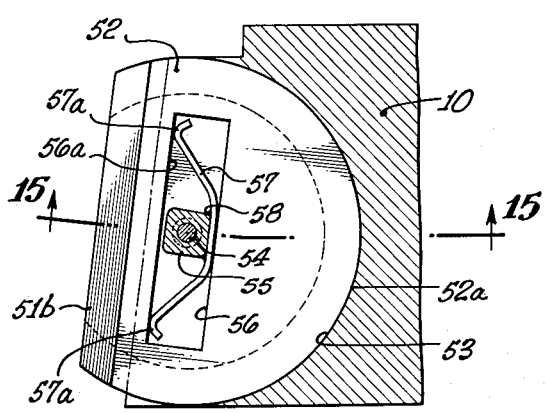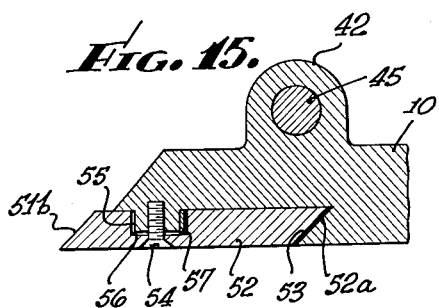

Feb. 6, 1962 E. O. SODERBERG 3,019,852
CLIMBER
Filed Jan. 2, 1958 3 Sheets-Sheet 3
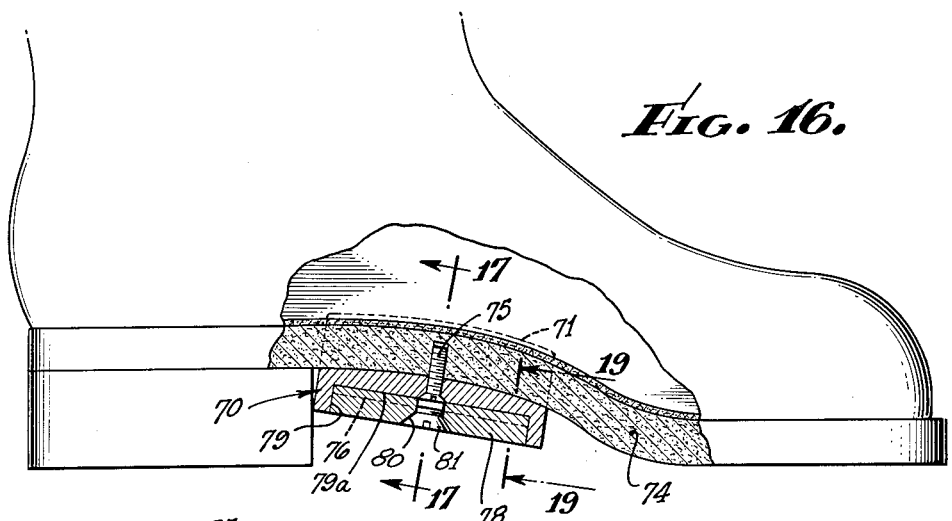
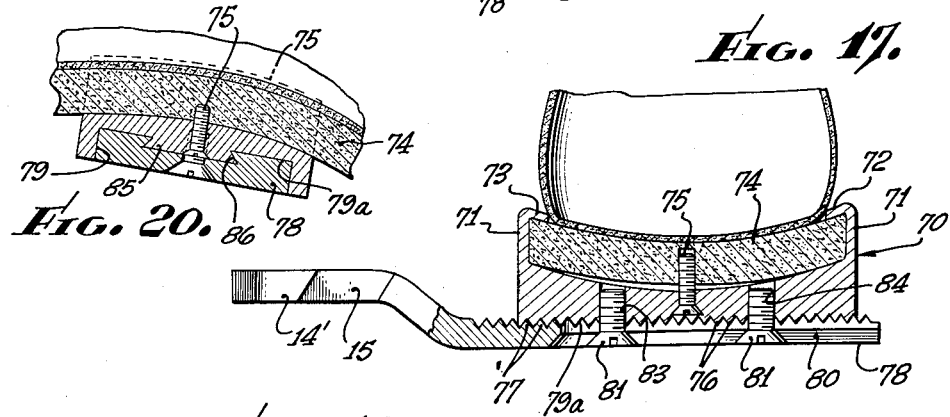
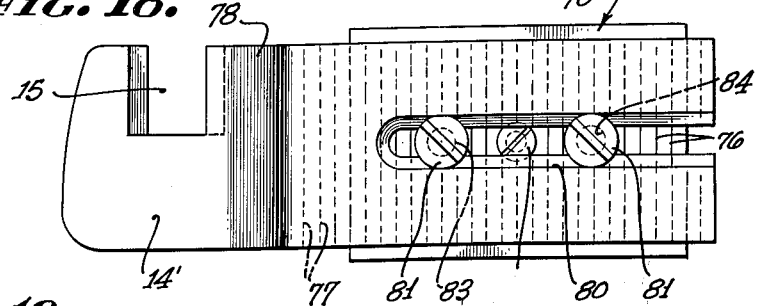
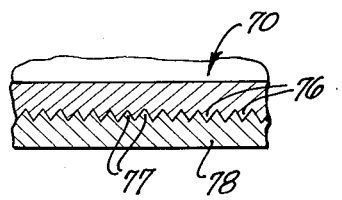
INVENTOR.
EMIL O. SODERBERG
BY
Huebner and Worrel
ATTORNEYS.

United States Patent Office 3,019,852
Patented Feb. 6, 1962

3,019,852
CLIMBER
Emil O. Soderberg, 1809½ Echo Park Ave.,
Los Angeles 26, Calif.
Filed Jan. 2, 1958, Ser. No. 706,633
5 Claims. (Cl. 182—134)

The present invention relates generally to devices usually known as climbers which are worn by workmen to assist them in climbing poles, columns, or other structural members. This invention is especially concerned with climbers which are designed to assist the workman in climbing steel columns or the like which are formed with outstanding flanges, although it will be understood that the invention is not necessarily limited to use with any partciular type of structural member.

There has been a long felt need for a device which can be worn by individual workers to assist in climbing structural steel members, such as I-beams, channels, and the like. These members have smooth surfaces which do not offer places where they can be easily gripped with the hands or feet; and because of the hard material, spikes or similar members which are adapted to penetrate into the member cannot be used. It has thus become a common practice for workmen to climb in any way that they can. This often involves bracing the knees against the flanges or other surfaces of the column as the workman pulls up with his hands, a method of climbing which requires considerable strength in order to obtain a friction grip on the smooth surface over which the workman is moving. It is obvious that there is considerable hazard involved since, without the assistance of some artificial aid, the workman is unable to obtain a secure grip upon the structural member being climbed.

Thus it becomes a general object of my invention to provide a simple, inexpensive climber which may be easily attached to the footgear of an individual workman to engage a portion of a steel column or a similar member to assist him in climbing up the member.

It is a further object of the invention to provide a climber which is adapted to grip the outstanding flange of a structural steel member in a manner which securely holds the weight of the workman as he climbs upwardly and yet which quickly and fully releases as the weight is taken off and the climber is moved up.

It is a still further object to provide a climber which is adjustable to fit various thicknesses of flanges in order to insure a firm grip at all times.

These objects have been attained in a preferred embodiment of my invention by providing a climber having a plate portion which is adapted to fit under a shoe or boot worn by the workman and which is provided with means for securely attaching the climber to the shoe. This plate portion has an extension which projects outwardly beyond the shoe on at least one side, and which may be formed with the plate portion or hingedly connected thereto. The extension has a recess therein which opens to one edge of the climber to receive the flange or other portion of a structural steel member. Opposing walls of the recess are inclined with respect to the plate portion, and also with respect to the length of the flange with which the climber is used, in order to engage the structural flange at two vertically spaced positions when the climber is generally horizontal and supporting the weight of the workman. When tilted slightly from the load-supporting position, the climber disengages from the flange to permit movement relative to it. The vertical spacing between the positions of engagement with the structural member can be increased in various ways to add to the firmness of the grip on the structural member.

How the above, and other objects of my invention are achieved will be more readily understood by reference to the following description and to the annexed drawings, in which:

FIG. 1 is a front perspective view of one form of my invention;

FIG. 2 is a perspective view showing the climber of FIG. 1 attached to a workman's boot;

FIG. 3 is a plan view showing the climber in FIG. 1 in gripping position on the flange of a structural steel member;

FIG. 4 is a view taken on line 4—4 of FIG. 3;

FIG. 5 is a plan view of a second form of my invention;

FIG. 6 is an enlarged fragmentary section taken on line 6—6 of FIG. 5;

FIG. 7 is a plan view of an insert for use in the climber of FIG. 5 to vary the width of the recess;

FIG. 8 is a plan view of a third form of my invention;

FIG. 9 is a fragmentary vertical section of a fourth form of my invention, using separately mounted jaw plates which engage the flange of a steel member; and FIG. 10 is a perspective view of one of the steel jaw plates of the climber shown in FIG. 9.

FIG. 11 is a plan view of a fifth form of my invention, using a hinged gripper extension;

FIG. 12 is a side elevation of the modified form shown in FIG. 11;

FIG. 13 is a fragmentary vertical section taken on line 13—13 of FIG. 11;

FIG. 14 is an enlarged fragmentary section taken on line 14—14 of FIG. 12;

FIG. 15 is a fragmentary cross-section taken on line 15—15 of FIG. 14;

FIG. 16 is a side elevational cross-section of a sixth form of my invention;

FIG. 17 is a cross-section taken on line 17—17 of Fig. 16;

FIG. 18 is a plan view of the modification shown in FIG. 16; and

FIG. 19 is a fragmentary vertical section taken on line 19—19 of FIG. 16.

FIG. 20 is a cross-section illustrating a further modification of FIGS. 16–19.

Referring to the drawings, there is shown in FIG. 1 a simplified form of my invention in which the climber includes a plate portion 10 which is adapted to contact the instep of a boot, shoe or other footgear, as shown in FIG. 2. The rear edge of the plate portion 10 may be recessed inwardly at 11 for a short distance to receive the front edge of the heel of the footgear and align the climber under the instep.

On the top surface of plate portion 10 there is provided a pair of loops 12 affording means for attaching the climber to the boot B. The loops 12 are so spaced as to be located one at each side of the boot so that a strap 13 can be attached to the loops and passed around or over the boot in any suitable manner, for example as shown in FIG. 2. In this manner the climber is firmly secured to the boot of the workman to hold the climber against accidental displacement.

At each end of the plate portion 10 is an extension 14 which projects outwardly beyond the boot, as shown clearly in FIG. 2. In each extension 14 is a recess 15 which opens to the forward edge of the climber, which is the edge facing in the direction of the toe of the boot as the climber is normally worn. The climber in FIG. 1 is shown as it would appear if manufactured from a steel plate of uniform thickness, although the invention is not necessarily so limited. When making it from a plate of uniform thickness, it is preferable that each extension 14 includes an upwardly and outwardly inclined section 14a. Recess 15 is located in this inclined portion of the extension for reasons which will be pointed out.

Each recess 15 is open at its forward edge and has two opposing generally parallel side walls 15a and 15b which are inclined with respect to the plane of plate portion 10. By so inclining the side walls of the recess, it will be noted from FIG. 4, when the flange F of a structural steel member 17 is engaged in the recess, inner side wall 15b engages the flange only at the lower edge 15d of the side wall. The outer side wall 15a engages the opposite side of flange F only at the upper edge 15f of the side wall. Hence the two opposing side walls of the recess engage the flange portion of structural member 17 at the two vertically spaced positions located by the lower and upper edges 15d and 15f.

By locating recess 15 in the inclined section 14a of the lateral extension 14 of the climber, the vertical spacing between these two positions of engagement with the flange F is increased by an amount determined by the inclination given to portion 14a. This increased spacing is desirable because it gives greater stability and security to the climber and increases the firmness of its grip on the flange. Also, increasing the thickness of the climber would increase correspondingly the distance between these positions of engagement with the flange.

The climber of FIG. 1 is placed underneath the instep of a boot and strapped or otherwise fastened securely to the boot, as shown in FIG. 2, there being one climber on each foot. The climber shown in FIG. 1 comprises two recesses 15 of different widths in order to better fit flanges F of two different thicknesses. For this reason the climbers are made in pairs of right and left hand climbers. For example, the recess at the outside of the boot is the narrower one, while the recess at the inside of the boot is the wider one. As far as a given recess 15 is concerned, it may be at either side of the foot since a climber as shown may be attached to either foot. In climbing very wide columns with deep flanges, it may be better to use the recesses at the outer sides of the foot, whereas in climbing smaller columns, or ones with shallow flanges, it may be easier to straddle the column as can be done when the flange engaging recess is at the inner side of each foot.

The climber of FIG. 1 is worn so that the recess 15 which is to be used opens toward the toe of the boot or forwardly of the wearer. Thus, by moving the boot forwardly toward structural member 17, the flange F or any other suitable portion of the structural steel member, may be positioned in the recess so that one of the two opposing walls of the recess is placed at each side of flange F, as shown in FIG. 3. When the workman rests his weight on the plate portion 10, the climber bites the flange as described and tends to rock counterclockwise about the two line areas of engagement, as shown by arrow 20 when viewed as in FIG. 4. The position 15d is closer to the point of applied weight, and lower than, the position 15f.

Inasmuch as the climber is designed primarily for climbing vertical columns the flange F is illustrated herein as a vertical member although it will be understood that the invention is not necessarily limited to this particular position since the climber may be used to climb members that are inclined to the vertical. The width of each flange engaging recess is so designed that when used with a flange F of the proper thickness, plate portion 10 of the climber extends substantially horizontally away from the flange, as shown in FIG. 4 when the two biting edges of the recess are in engagement with the flange. However, it will be understood that reference to this horizontal position is for descriptive purposes only and not by way of limitation.

By inclining side walls 15a and 15b of the flange engaging recess 15, a distinct advantage is obtained. The inclined side walls make acute angles with the top and bottom parallel faces of the climber, thus providing narrow edges at 15d and 15f which engage the flange. Because of the small area of these edge portions, very high unit pressures are developed which enable the climber to "bite" into the flange and secure a firm hold. When the workman lifts his foot, the free end of the climber, which is the left hand end in FIG. 4, is raised slightly with respect to the end engaging the flange; and this tilting of the climber frees it from engagement with the flange sufficiently to allow the climber to be slid upwardly with respect to flange F as the workman raises his knee in the process of climbing structural member 17. As he again puts his weight on the climber, the outer or free end is depressed and brought again to the horizontal position in which the climber firmly engages flange F.

These is shown in FIGS. 5 and 6 a modified form of my invention which is provided with only a single recess 15 of variable size. Accordingly, there is but one extension 14 at one end of plate portion 10. In this embodiment of the invention, one of the two opposing side walls of the recess 15 is formed integrally with the main body of the climber; side wall 15b is the same as shown in FIGURES 1–4. However, the opposing side wall 15a of the recess is provided by a cooperating insert 21. Insert 21 is detachable from the main body of the climber in order that it may be removed and replaced by other inserts of different widths in order to change the distance between side walls 15a and 15b of the recess. For this purpose, insert 21 is provided with a tongue and groove connection with extension 14 in order to transmit the necessary loads between the insert and the climber body. The insert is held in place by a screw 22 which engages threads in both the insert and the extension.

The insert removed from the climber is shown in FIG. 7. In this view, the tongue 21a may be clearly seen extending around two sides of the insert. One-half of the threaded bore engaged by screw 22 when it passes tongue 21a is indicated at 21b.

When the insert 21 is of maximum width, then recess 15 is of minimum width. If it is desired to widen recess 15, the wide insert is removed and replaced by a narrower insert. By providing a workman with a single climber of the design shown in FIG. 5 and a series of inserts of different widths, as shown in FIG. 7, he can quickly obtain the desired width of recess 15 in order to adapt the climber to any width of flange or other structural member to be engaged by the climber.

There is shown in FIG. 8 another form of my invention in which there is provided but a single recess which opens to the side of the foot rather than forwardly. In this embodiment, plate portion 10 of the climber is the same as previously described and is provided with loops 12 for the attaching strap or other securing means. At one end of this plate portion, is lateral extension 24 in which is located recess 25 with the open end of the recess at the end of the climber. The recess is formed in a similar manner to recess 15 with two parallel, opposite side walls 25a and 25b which are inclined from the vertical in order to provide vertically spaced, narrow edges which engage the flange in the manner previously described. In order to increase the spacing between the points of engagement with the flange, a twisted offset 24a of extension 24 is raised above the remainder, producing at the area indicated at 24b a sloping or inclined surface. The twisted offset 24a is at the forward corner of the lateral extension of the climber.

This form of climber operates in the same manner previously described, except that the foot is moved sideways to position the recess 25 over the flange or other similar portion of the structural member. Control or engagement with this flange is effected by rocking the foot in a forward direction to release from the flange and in a rearward direction to engage the flange. As in the other forms, the climber rocks in a vertical plane but the axis of rotation is transverse to the foot of the wearer instead of extending from front to rear as in the form of climber shown in the earlier described figures.

The modification as shown in FIG. 9 embodies basically the same form as shown in FIGS. 1–4 but with the addition thereto of a pair of jaw plates which are serrated or otherwise formed to provide teeth which grip the structural member. The two jaw plates 30 and 31 are mounted on opposite sides of recess 32 which has been made wider to accommodate the additional thickness of the two jaw plates, but other wise may be formed in the same manner as previously described. Jaw plate 30 is pivotally mounted on a loop 33 carried at one end of the plate portion 10 of the climber. The plate is positioned at one side of recess 32 with the gripping teeth facing toward the center of the recess and the back of the jaw plate engaged by the body of the plate portion and extension. In order to maintain the jaw plate in this position at all times, it is preferable to provide compression spring 35 which bears at one end against plate portion 10 of the climber and at the other end against a small lug 36 on the upper portion of the jaw plate 30, the pressure of the spring being in a direction to force the jaw plate against the inner side of recess 32.

In a similar manner the opposing jaw plate 31 is pivotally mounted on a loop 38 which is on the lateral extension 14 of the climber. Jaw plate 31 is likewise provided with teeth on the face toward the center portion of the recess while the back side of jaw plate bears against the contiguous side of the recess. The jaw plate is maintained in this position by compression spring 39 which bears at one end against the extension 14 of the climber and at the other end against a lug 40 formed integrally with the upper portion of the jaw plate.

In use, this form of climber is worn in the same manner as the climber illustrated in FIGS. 1–4, and it operates in the same manner except that the two jaw plates are in direct engagement with the flange of the structural member. This has the advantage that the jaw plates may be hardened members and may be provided with several teeth, thus affording a multiple gripping action upon the flange which is being gripped.

There is shown in FIG. 11 still another form of my invention. This embodiment is basically the same as the form shown in FIG. 5 but with the added feature of hinging the extension 41 so that when the climber is not being utilized the extension may be raised from a horizontal to a vertical inactive position as best shown in FIG. 12. The plate portion 10 is provided at an end region with spaced hinge barrel segments 42 alternately interlocking with spaced hinge barrel segments 43 in turn struck from the extension 41. The barrel of the hinge, composed of the interlocking barrel segments, provides a tubular opening 44 to receive a hinge pin 45. The hinge pin 45 has a head 45a of quadrilateral shape which is non-rotatably seated in a complementary recess 43a in a barrel segment 43 of the extension 41. When the extension 41 is pivoted the hinge pin 45 will turn coaxially with the extension.

A locking mechanism is provided to hold the extension 41 in a horizontal or vertical position. It comprises a leaf spring 46 secured at one end to the base plate 10 by a rivet 47 or other suitable means. The spring 46 is bent upward and outward from the plate adjacent the rivet 47, and generally centrally located on the under side of the inclined portion of the spring is a pin 48. A groove 43b is provided in the hinge barrel to receive the spring 46. Pin receiving recesses 49 and 50 in the hinge pin 45 are adapted to receive the pin 48, and the pressure of the spring 46 will cause the pin 48 to lock in a recess 49 or 50 depending on the position of the extension 41. The recesses 49 and 50 are spaced approximately 90° apart.

In order to raise or lower the extension 41 the spring 46 is pulled upward by finger pressure to release the pin 48 from the recess 49 or 50 of the hinge pin 45. The extension may then be raised or lowered and the pin 45 cooperating with the extension 41 will revolve about its axis so that recess 49 or 50 will be in position to receive pin 48 when the spring 46 is released. In this manner the extension 41 is locked in either an up position or a down position, as is shown in FIG. 12.

The single gripping recess 51 of this embodiment has side walls similar to those illustrated in FIGS. 1–4. In this modified form the side wall 51a is formed integral with the extension 41.

In order to provide the opposing parallel side wall 51b, a flat semi-circular disc 52 is secured to the plate 10 by means to be described later. The peripheral face of the disc 52 is cut at an oblique angle with respect to its axis forming a parallelogram in cross-section. The wall 51b of the disc is formed by cutting a secant plane across the circumference of the disc. The oblique angle and secant plane of the side wall 51b may be set approximately parallel to side wall 51a similar to gripping members described above.

The side wall 51b is not stationary but pivotally mounted in the plate 10. This is done by providing a circular notch 53 at one end of the plate 10 into which the disc 52 is set. In order to secure the disc 52 to the plate 10 a square boss 55 formed on the plate is inserted in a rectangular recess 56 formed in the top surface of the disc 52. The recess 56 is wider and longer than the boss for reasons to be explained later. A screw 54 passes upwardly through the disc 52 and into the boss 55 to hold the disc to the plate 10 so that the disc 52 may pivot in the recess 53.

In order to maintain the side wall 51b in alignment with wall 51a when no flange is engaged a generally bow shaped spring 57 is seated in the recess 56 so that the central portion of the bow of spring 57 is placed between the boss 55 and one of the elongated side walls of the recess 56. The two ends 57a and 57b of the spring rest against the opposite elongated wall 56a of recess 56. The spring 57 is secured to the boss 55 by means of welding 58 or other suitable means.

In operation, the side wall 51b is pivoted from its position shown in FIGS. 11 and 14 whenever the recess 51 engages a flange not having parallel sides. When the climber is removed from the flange the spring 57 having been irregularly depressed by pressure on either end 57a or 57b will force the disc 52 to its normal at rest position as shown in FIGS. 11 or 14. The purpose of having one side wall of the recess pivoted is because in some cases a flange of a structural member is narrower at its front edge than it is at the rear portion which joins the web. Thus, by this embodiment, any type of flange may be gripped, whether or not the flange has parallel sides.

A further embodiment of my invention is illustrated in FIGURES 15, 16, 17, 18 and 19, which employs a different method of securing a climber to footgear. This modification utilizes a base plate designated generally as 70 which has a width greater than the width of the instep portion of a boot sole. The plate 70 has upwardly extending clamp portions 71 which are turned in at their upper edges forming clamping flanges 72 and 73, engaging the upper edge portions of the boot sole 74. To complete securement of the base 70 to the sole a hole is provided in the plate 70 through which a screw 75 passes and thence into a central portion of the sole 74. The upper portion of the base plate 70 is curved at its top portion in cross section slightly more concave than the curve of the boot sole 74. This is done so that when the screw 75 is drawn tight into the sole 74 a more complete and tight fit is possible for the plate 70.

The base plate 70 has a channel 79 comprising two sides and a bottom 79a extending laterally from one side of the boot to the other. The channel 79 is located on the bottom portion of the base plate 70 and its width is slightly greater than the width of the climber plate 78 to be described. Sawtooth serrations 76 are formed on the bottom 79a of the channel.

The gripper element comprises the climber plate 78 including a single extension 14′ which projects outwardly beyond the boot as has been described before. The plate 78 on its upper flat surface is provided with parallel sawtooth serrations 77 which extend from the front to rear edge of the plate 78. A longitudinal slot 80 is positioned crossways to the toe and heel in the plate 78, from the end opposite the extension inward to a point beyond the middle of the plate. This slot 80 extends longitudinally through the plate 78 so that when the plate 78 is placed in the channel 79 of the base 70 it will be aligned with threaded openings 83 and 84 in base 70.

In order to secure the plate 78 to the base 70 the plate 78 is placed in the channel 79 so the sawtooth serrations 76 and 77 meet and interlock, then screws 81 are screwed through the slot 80 and into the threaded openings 83 and 84 in the base. The screw having a wider head than the width of the slot 80, the plate is held to the base 70.

The serrations 76 and 77 act to hold the climber from relative movement until the set screws 81 are loosened. Further, by moving the gripping recess closer to or further from the foot, the leverage will be increased or decreased accordingly.

Another advantage of such an embodiment illustrated in FIGS. 16–19 is that by having the plate 78 detachable from the base 70 new plates may be secured to the base 70 having smaller or larger recesses 15 in the extensions 14' depending upon the size of the flange to be gripped.

FIG. 20 illustrates another form of securing the climber plate 78 to the clamp 71. The clamp 71 at the bottom 79a of the channel 79 is provided with a key 85 extending laterally from one side of the boot to the other. The plate 78 on its upper flat surface has a key slot 86 which is engageable with the key 85.

In operation, the plate 78 is slid into the channel 79 so that the key 85 is positioned in the key slot 86 and moved laterally from one side of the foot to the other so as to position the extension 14'. A set screw 87 passes through base 78 into the key 85 of the clamp 71 to set the plate 78 and keep it from lateral movement.

While the instant invention has been shown and described herein in what is conceived to be the most practical and preferred embodiment, it is recognized that departures may be made therefrom within the scope of the invention, which is therefore not to be limited to the details disclosed herein but is to be accorded the full scope of the claims so as to embrace any and all equivalent devices.

What I claim is:

1. A climber device for use with foot gear for climbing a flanged structural member, comprising an elongated foot plate adapted to be secured to a shoe and to extend transversely with respect to the shoe, the foot plate having therein a forwardly open recess adjacent one end thereof and defined by longitudinally spaced sides, an insert plate mounted on the foot plate and having a gripping edge projecting beyond one of said spaced sides of the recess toward the other of said spaced sides and terminating a predetermined distance from the latter, the other of said sides having thereon a gripping edge facing the gripping edge of the insert plate, said gripping edges being arranged substantially normal to the longitudinal axis of the foot plate with the inner gripping edge disposed a spaced distance below the outer gripping edge, whereby the gripping edges function to receive the flange of a structural member therebetween and to grip the opposite sides of the latter at vertically spaced points, and means mounting the insert plate for movement automatically to displace its gripping edge angularly with respect to the said other gripping edge for receiving between said gripping edges a tapered flange of a structural member.

2. A climber device for use with foot gear for climbing a flanged structural member, comprising an elongated foot plate adapted to be secured to a shoe and to extend transversely with respect to the shoe, the foot plate having thereon a forwardly open recess adjacent one end thereof and defined by longitudinally spaced sides, a disc secured pivotally to the foot plate for rotation on an axis substantially normal to the plane of the foot plate, the disc having a gripping edge projecting beyond one of said spaced sides of the recess toward the other of said spaced sides and terminating a predetermined distance from the latter, the other of said sides having thereon a gripping edge facing the gripping edge of the disc, said gripping edges being arranged substantially normal to the longitudinal axis of the foot plate with the inner gripping edge disposed a spaced distance below the outer gripping edge, whereby the gripping edges function to receive a flange of a structural member therebetween and to grip the opposite sides of the latter at vertically spaced points.

3. The climber device of claim 2 including spring means interengaging the disc and foot plate for maintaining the gripping edge of the disc normally substantially parallel to the said other gripping edge.

4. A climber device for use with footgear for climbing a flanged structural member, comprising an elongated foot plate adapted to be secured to a shoe and to extend transversely with respect to the shoe, an end extension disposed at one end of the foot plate, pivot means interconnecting the foot plate and end extension for rotation of the latter on an axis substantially normal to the longitudinal axis of the foot plate between an outwardly projecting operative position and an upwardly projecting retracted position, the extension having a forwardly open recess therein the outer face of which defines an outer gripping edge projecting toward the foot plate and arranged substantially normal to the longitudinal axis of the foot plate, and an inner gripping edge on the end of the foot plate adjacent the extension, the inner gripping edge being arranged longitudinally inward of and projecting toward the outer gripping edge a spaced distance below the latter, whereby the outer and inner gripping edges function to receive the flange of a structural member therebetween and to grip the opposite sides of the latter at vertically spaced points.

5. The climber device of claim 3 including lock means releasably interconnecting the foot plate and end extension for maintaining the latter in its positions of extension and retraction.

References Cited in the file of this patent

UNITED STATES PATENTS

| 560,391 | Checkley | May 19, 1896 |
| 877,418 | Foldvik | Jan. 21, 1908 |
| 1,482,745 | Heid | Feb. 5, 1924 |
| 2,082,553 | Shaw et al. | June 1, 1937 |

FOREIGN PATENTS

| 63,925 | Austria | Mar. 10, 1914 |
| 74,755 | Switzerland | Apr. 2, 1917 |
| 96,331 | Switzerland | Oct. 2, 1932 |